Dec. 21, 1965         W. G. PRESTON         3,224,258
TESTING MACHINE FOR SAFETY SEAT BELTS
Filed Oct. 17, 1962                        3 Sheets-Sheet 1

INVENTOR.
WALTER G. PRESTON
BY
*Flehr and Swain*
ATTORNEYS

Dec. 21, 1965   W. G. PRESTON   3,224,258
TESTING MACHINE FOR SAFETY SEAT BELTS
Filed Oct. 17, 1962   3 Sheets-Sheet 2
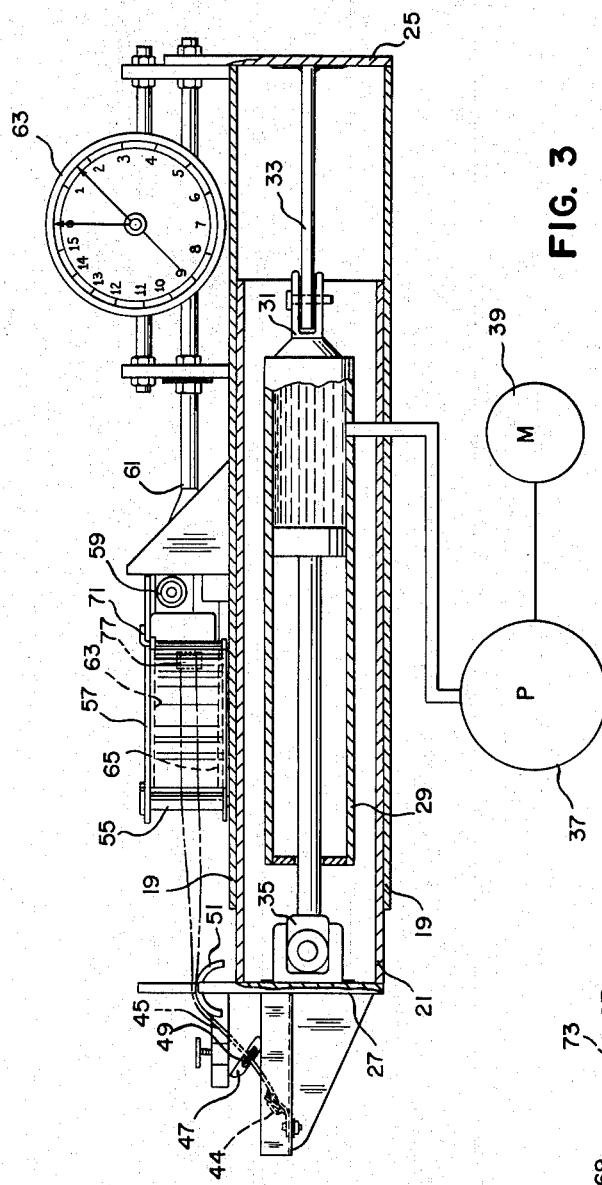
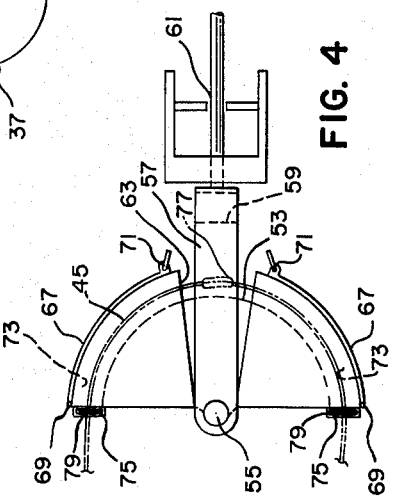
INVENTOR.
WALTER G. PRESTON
BY
ATTORNEYS Dec. 21, 1965   W. G. PRESTON   3,224,258
TESTING MACHINE FOR SAFETY SEAT BELTS
Filed Oct. 17, 1962   3 Sheets-Sheet 3

INVENTOR.
WALTER G. PRESTON
BY
ATTORNEYS

United States Patent Office 3,224,258
Patented Dec. 21, 1965

3,224,258
TESTING MACHINE FOR SAFETY SEAT BELTS
Walter G. Preston, Tulare, Calif., assignor to Tulareloft, Incorporated, Tulare, Calif., a corporation of California
Filed Oct. 17, 1962, Ser. No. 231,082
3 Claims. (Cl. 73—95)

This invention relates to testing machines for safety seat belts and more particularly to such machines which are sufficiently small, compact and safe so that they may be easily moved about, for testing at various locations.

A great number of people are aware of safety seat belts for automobiles but have not been aware of the various features and capabilities thereof. Consequently, it is desirable to make such facts known, not only to the general public but to those who actually distribute and sell seat belts to the general public. Since seat belts are often made of nylon webbing they exhibit a high degree of stretch comparable to the force to which they are subjected while in use. The testing devices then have been rather elaborate and necessarily cumbersome in accommodating this stretch.

In addition testing machines of the prior art have been encased in cages of various types to provide protection for the operating personnel. These cages are particularly necessary when, in addition to the nylon belts, metal buckles and other attachment devices are also tested. It is, therefore, a general object of this invention to provide an improved testing machine for safety seat belts.

It is a more particular object of this invention to provide a testing machine for safety seat belts which is relatively compact and still capable of fully testing the belts.

It is another object of this invention to provide a testing machine of the aforementioned character which incorporates improved means for protecting personnel from flying debris produced by ruptured belts.

These and other objects and features of the invention will become more clearly apparent upon a review of the following description taken in conjunction with the accompanying drawing, in which:

FIGURE 3 is a longitudinal sectional view of the operative portion of the machine shown in FIGURES 1 and 2;

FIGURE 4 is a top plan view of a drum for holding the safety seat belt to be tested;

Figure 1:
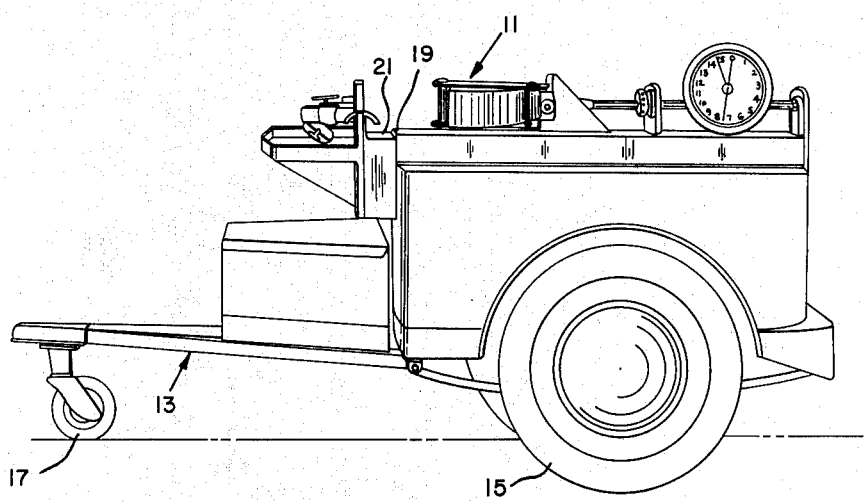
FIGURE 1 is a side elevation of a testing machine in accordance with this invention.

Referring to FIGURE 1 there is shown a testing machine 11 secured to a trailer-like frame 13 incorporating the wheels 15 and 17. The machine itself includes a tubular guide member 19, more clearly shown in FIGURES 2 and 3. A slide member or ram 21 is telescopically disposed within the guide member and includes thereon various markings 23 to indicate the amount of its extension from the guide member. As can best be seen in FIGURE 3, a bracket 25 is secured to one end of the guide member 19, an additional bracket 27 is secured to that end of the slide 21 opposite from the bracket 25. The dimensions of the guide member 19 and the slide 21 are chosen such that sliding movement therebetween is permissible but that transverse or canting movement therebetween is restricted.

A hydraulic piston 29 is disposed within the guide 19 and slide 21 and has one end 31 pivotally secured to the bracket 25 by means of an extension 33. The other end 35 of the hydraulic piston is secured to bracket 27. The hydraulic piston is activated by means of fluid from the pump and source of fluid 37 which in turn is activated by an electric motor 39.

Figure 2:
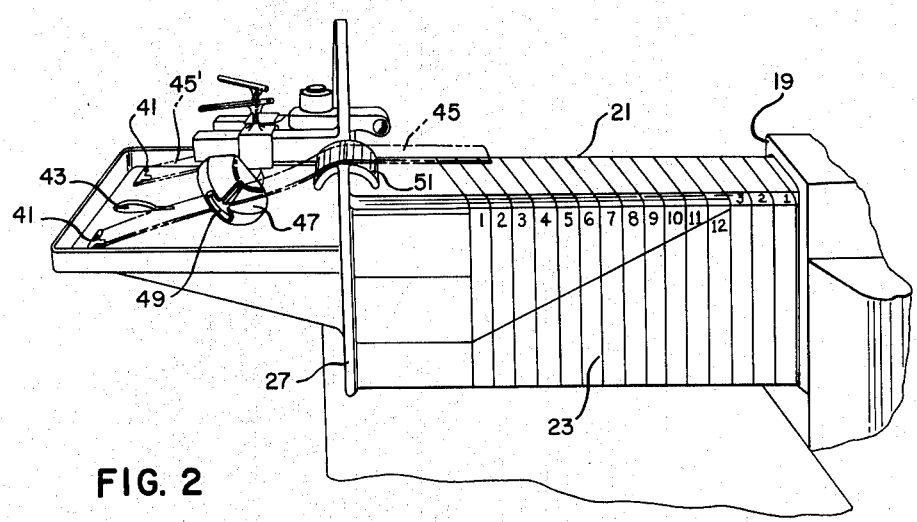
FIGURE 2 is an enlarged perspective view of a portion of the machine shown in FIGURE 1, illustrating particularly the extended ram thereof.

As can better be seen in FIGURE 2, the guide member 21 includes means for holding the ends of the safety seat belt 45. This includes a pair of openings 41. Alternatively a center opening 43 may be employed whereby both ends of a belt may be secured at a common point. In normal practice the belt is secured within the opeinngs 41 in a manner similar to the manner in which the brackets 44 are usually applied to the floorboard of an automobile. The belt 45 then extends through a receptacle 47 and fingers 49 (to be further described hereinafter) and about a shoe 51. Although not completely shown, the other end of the belt 45' extends similarly on the far side of the testing machine.

Referring to FIGURES 3 and 4, means are provided on the guide member 19 for securing the belt intermediate its ends. This means includes a drum 53 which is pivoted as at 55 to a yoke 57. The yoke 57 is further pivoted as at 59 to an eye bar 61. The eye bar 61 forms a portion of a dynamometer 63.

Secured to the drum 53 are upper and lower plates 63 and 65, respectively, which extend slightly beyond the drum 53. Shield means 67 are hinged to the plates 63 and 65 as at 69 whereby they may be selectively removed away from the drum. Latching pins 71 are provided to maintain the shield in closed position during testing operations whereby channel 73 is formed between the drum 53 and the shield 67.

Receptacles 75 similar to the receptacles 47 (FIGURES 2 and 3), are disposed adjacent the drum 53 and shield 67. Thus it is seen that the opposite ends of the belt 45 may be secured with its normal securing means at the openings 41 and then passed through the receptacles 47 and over the shoes 51. With the shields 67 in their open or removed position, the belt may be passed through the receptacles 75, about the drum 53 and buckled in approxicately the center thereof as shown as at 77.

The shields 67 may then be closed and latched and power applied to the motor 39. The power to the motor 39 will cause the piston 29 to operate thereby urging the slide 21 out of the guide 19 and consequently tending to stretch the belt 45. Since the drum 53 is retained on mutually perpendicular pivots 55 and 59, the belt 45 is free to twist in its natural fashion thereby giving true test results.

As the piston 29 continues to operate, the slide 21 continues to extend outward to a position similar to that shown in FIGURE 2. Upon application of sufficient force by the hydraulic piston 29 the safety belt 45, or its attachment devices 44, or the buckle 77 will rupture. At the point of rupture the dynomometer may be read thereby giving a true strength indication of the overall assembly including belt, buckle and mounting devices.

Figures 5, 6, 7, 8:
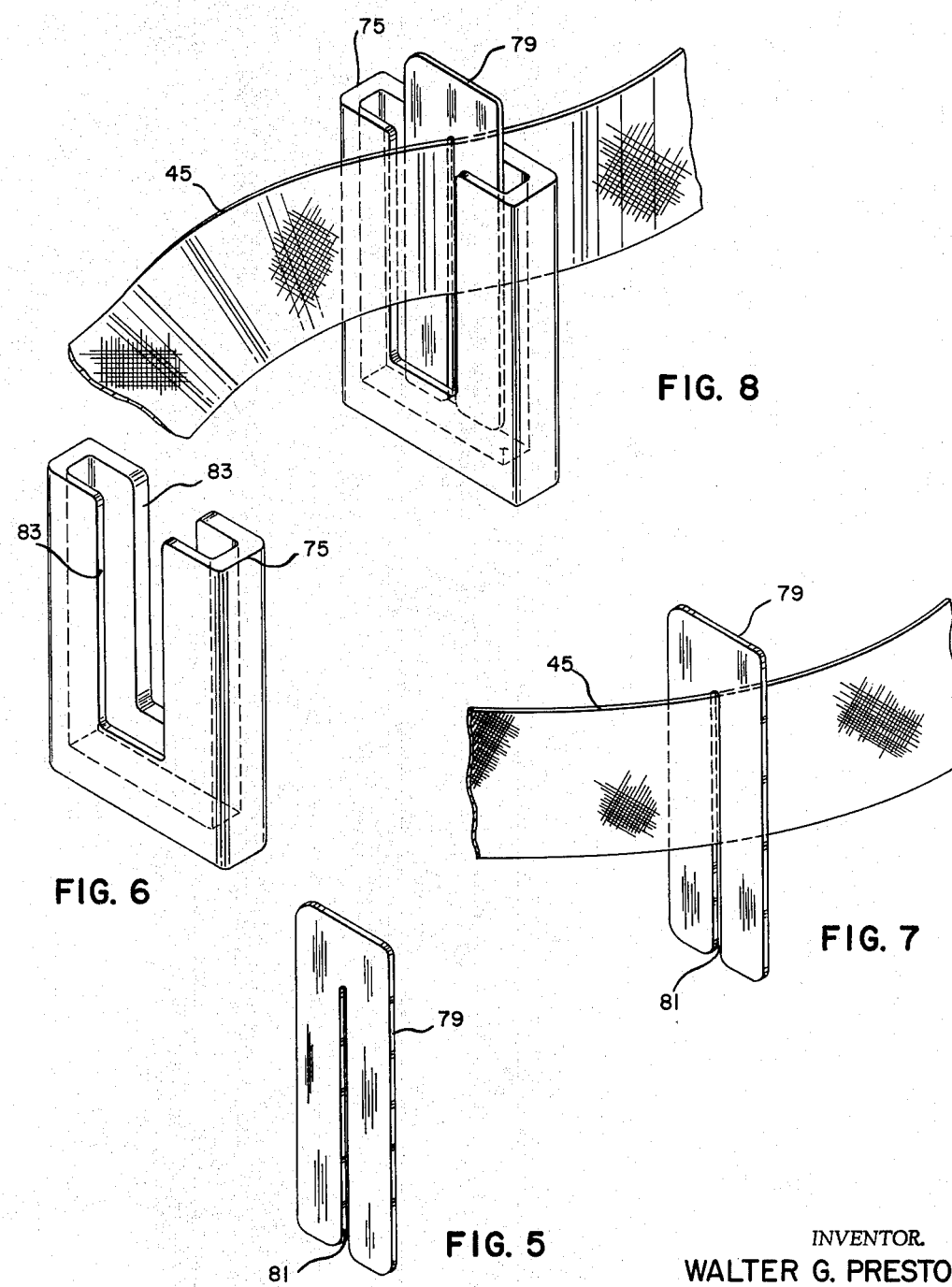
FIGURE 5 is a perspective view of a bifurcated finger to be employed in accordance with the invention.
FIGURE 6 is a perspective view of a receptacle to be used in accordance with the invention.
FIGURE 7 is an illustration of the bifurcated finger of FIGURE 5, as shown in conjunction with the safety seat belt.
FIGURE 8 is a perspective view showing the cooperation of a finger in a receptacle of FIGURES 5 and 6 together with the safety seat belt to be tested.

Referring to FIGURES 5 to 8, the receptacles 75 and finger 79 are more fully disclosed. The receptacle 47 and the finger 49 are substantially identical. Referring to FIGURE 5, there is shown a bifurcated finger 79 having a slot 81. The dimensions of the slot 81 are chosen such that the finger will fit snugly about the belt 45, as shown in FIGURE 7.

Referring to FIGURE 6, the receptacle 75 proper, is shown and it is shown as an open ended receptacle.

Moreover, the receptacle 75 is slotted as at 83. The dimensions of the receptacle are chosen such that fingers 79 fits loosely therein. Moreover, the slots 83 are such that the belt 45 will pass through unobstructed.

In assembling the fingers 79 are first passed over the belt 45. This assembly is then placed into the receptacle 75 as shown in FIGURE 8. Since the fit of the fingers 79 on the belt 45 is merely snug and not tight, the belt 45 is free to pass therethrough upon stretching of the belt as during the testing operation. However, upon rupture of the belt 45 or the buckle or mounting means, rapid movement of the belt through the fingers is prevented. For instance, referring to FIGURE 3, if the mounting means 44 were to rupture, a portion thereof could not pass through the finger 79 and its associated receptacle 47. Likewise, if the buckle 77 were to rupture the same could not pass beyond the receptacle 75.

A typical snug fit for said belt and finger is provided with a belt having a relaxed thickness of 0.075 inch and a slot 81 having a width of 0.078 inch.

Thus, it is apparent that the complete seat belt assembly may be tested in the testing machine described hereinabove. The machine described moreover, is relatively compact and provides a high degree of safety for personnel.

I claim:

1. A machine for testing safety seat belts comprising a tubular guide member, a slide member telescopically disposed within said guide member, a first bracket secured across one end of the guide member, a second bracket secured across that end of the slide member opposite said one end of the guide member means secured between said first and second brackets for urging said slide member out of said guide member, holding means one one of the members for securing the ends of the safety seat belt and second holding means on the other of the members for securing the safety seat belt at a point intermediate its ends, said second holding means comprising a drum, said drum being pivotally secured to said other of the members, shield means recovably disposed about said drum, and an open ended receptacle disposed adjacent said drum and said shield means, said receptacle being slotted, bifurcated finger means disposed within said receptacle, said receptacle and finger means being adapted to receive the safety seat belt to be tested.

2. A machine for testing safety seat belts comprising a tubular guide member, a slide member telescopically disposed within said guide member and adapted to progressively define the degree of displacement of said members, a first bracket secured across one end of the guide member, a second bracket secured across that end of the slide member opposite said one end of the guide member, means secured between said first and second brackets for urging said slide member out of said guide member, holding means on one of the members for securing the ends of the safety seat belt and second holding means on the other of the members for securing the safety seat belt at a point intermediate its ends, a pair of open ended receptacles secured to said one of the members, each of said receptacles being slotted, and bifurcated finger means disposed within said receptacles generally normal to the belt, said finger means and receptacle being adapted to provide a slot to receive the safety belt to be tested.

3. In a machine for testing safety seat belt assemblies, an open ended receptacle adapted to be carried substantially normal to the seat belt being tested, said receptacle being slotted to receive said belt therethrough, and bifurcated finger means disposed loosely within said receptacle to be carried substantially normal to the belt, said finger means being adapted to fit snugly about the safety seat belt to be tested whereby said belt is held secure at said receptacle even after rupture of the belt assembly.

References Cited by the Examiner

UNITED STATES PATENTS

| | | | |
|---|---|---|---|
| 1,538,853 | 5/1925 | Hazelton | 74—611 |
| 2,252,804 | 8/1941 | Gass | 24—198 |
| 2,763,149 | 9/1956 | Long et al. | 73—103 X |
| 2,893,240 | 7/1959 | Able | 73—95 |
| 3,049,916 | 8/1962 | Weiner | 73—95 |

RICHARD C. QUEISSER, *Primary Examiner.*